(12) United States Patent
Tucker et al.

(10) Patent No.: US 12,548,843 B2
(45) Date of Patent: Feb. 10, 2026

(54) MODULAR BATTERY SYSTEMS AND BATTERY MODULES THEREOF

(71) Applicant: XING POWER INC., Mahé (SC)

(72) Inventors: Kareem Azizi Tucker, Taipei (TW); Yu-Chung Lin, Taipei (TW)

(73) Assignee: XING POWER INC., Mahé (SC)

( * ) Notice: Subject to any disclaimer, the term of this patent is extended or adjusted under 35 U.S.C. 154(b) by 1062 days.

(21) Appl. No.: 17/503,697

(22) Filed: Oct. 18, 2021

(65) Prior Publication Data
US 2022/0037733 A1 Feb. 3, 2022

Related U.S. Application Data

(63) Continuation-in-part of application No. 16/388,282, filed on Apr. 18, 2019, now Pat. No. 11,742,533, and
(Continued)

(51) Int. Cl.
| | |
|---|---|
| *H01M 50/262* | (2021.01) |
| *H01M 10/613* | (2014.01) |
| *H01M 10/643* | (2014.01) |
| *H01M 10/6556* | (2014.01) |
| *H01M 50/213* | (2021.01) |
| *H01M 50/543* | (2021.01) |

(Continued)

(52) U.S. Cl.
CPC ....... *H01M 50/262* (2021.01); *H01M 10/613* (2015.04); *H01M 10/643* (2015.04); *H01M 10/6556* (2015.04); *H01M 50/213* (2021.01); *H01M 50/543* (2021.01); *B60R 7/04* (2013.01); *H01M 10/625* (2015.04); *H01M 10/6557* (2015.04); *H01M 50/249* (2021.01); *H01M 50/503* (2021.01); *H01M 50/507* (2021.01); *H01M 50/528* (2021.01); *H01M 2220/20* (2013.01); *Y02E 60/10* (2013.01)

(58) Field of Classification Search
CPC ..... B60R 7/04; H01M 10/613; H01M 10/625; H01M 10/643; H01M 10/6556; H01M 10/6557; H01M 2220/20; H01M 50/213; H01M 50/249; H01M 50/262; H01M 50/503; H01M 50/507; H01M 50/528; H01M 50/543; Y02E 60/10
See application file for complete search history.

(56) References Cited

U.S. PATENT DOCUMENTS

| | | | | |
|---|---|---|---|---|
| 2012/0114998 A1* | 5/2012 | Hwang | ............... | H01M 50/213 429/99 |
| 2016/0099451 A1* | 4/2016 | Murai | ................. | H01M 50/509 429/54 |
| 2017/0005384 A1* | 1/2017 | Harris | ................. | H01M 50/209 |

* cited by examiner

Primary Examiner — Lingwen R Zeng
(74) Attorney, Agent, or Firm — ScienBiziP, P.C.

(57) ABSTRACT

A modular battery system and a battery module thereof are provided. The battery module comprises a peripheral sidewall, at least one battery cell and a connector structure. The peripheral sidewall defines a tubular space. The at least one battery cell is disposed in the tubular space. The connector structure is disposed on km edge of the peripheral sidewall and configured to fasten an external module including an open entrance to an external space. The edge defines an opening of the tubular space. When the connector structure fastens the external module, a fluid channel is formed by joining the opening defined by the edge and the open entrance of the external module, and a shape of the fluid channel is defined by the tubular space, a shape of each of the at least one battery cell and the external space.

20 Claims, 10 Drawing Sheets

Related U.S. Application Data a continuation-in-part of application No. 16/385,598, filed on Apr. 16, 2019, now Pat. No. 11,014,503.

(51) Int. Cl.
*B60R 7/04* (2006.01)
*H01M 10/625* (2014.01)
*H01M 10/6557* (2014.01)
*H01M 50/249* (2021.01)
*H01M 50/503* (2021.01)
*H01M 50/507* (2021.01)
*H01M 50/528* (2021.01)

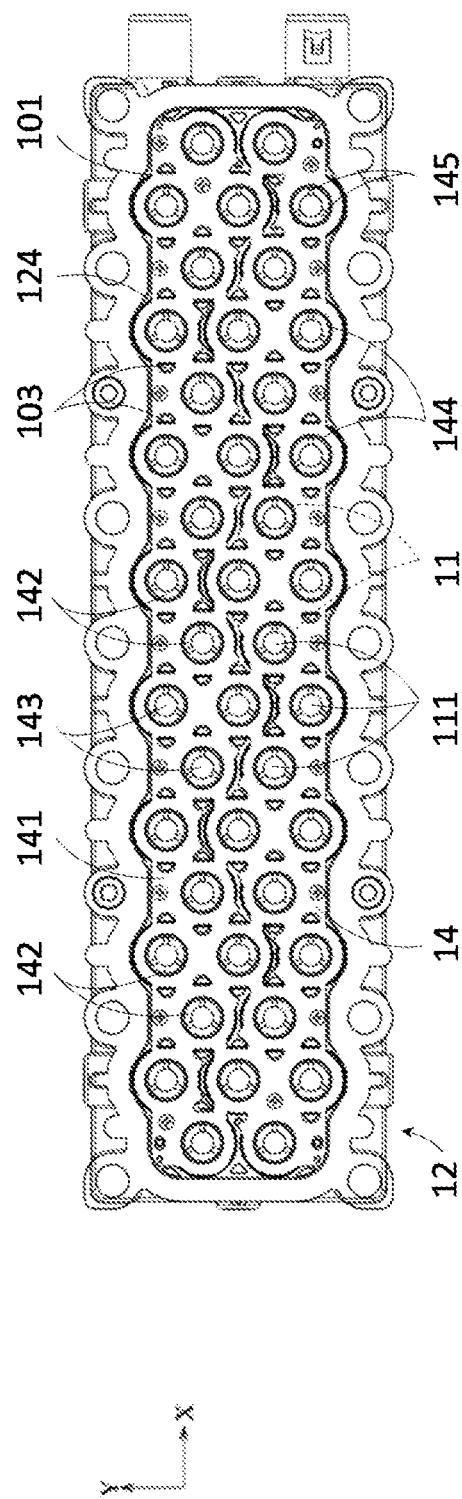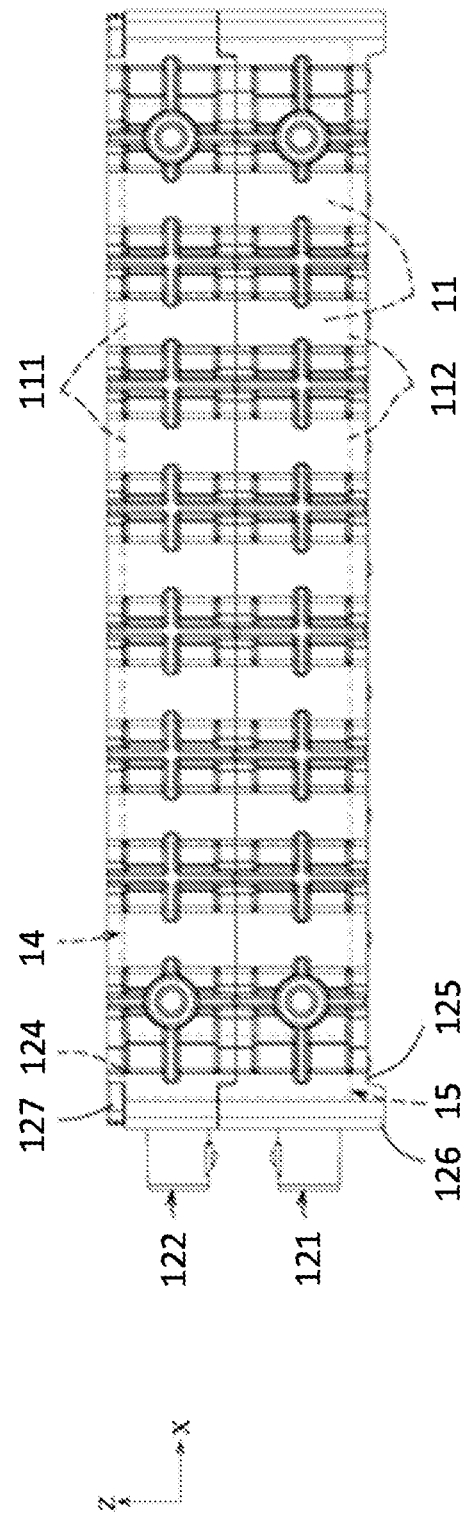
FIG. 4
FIG. 5

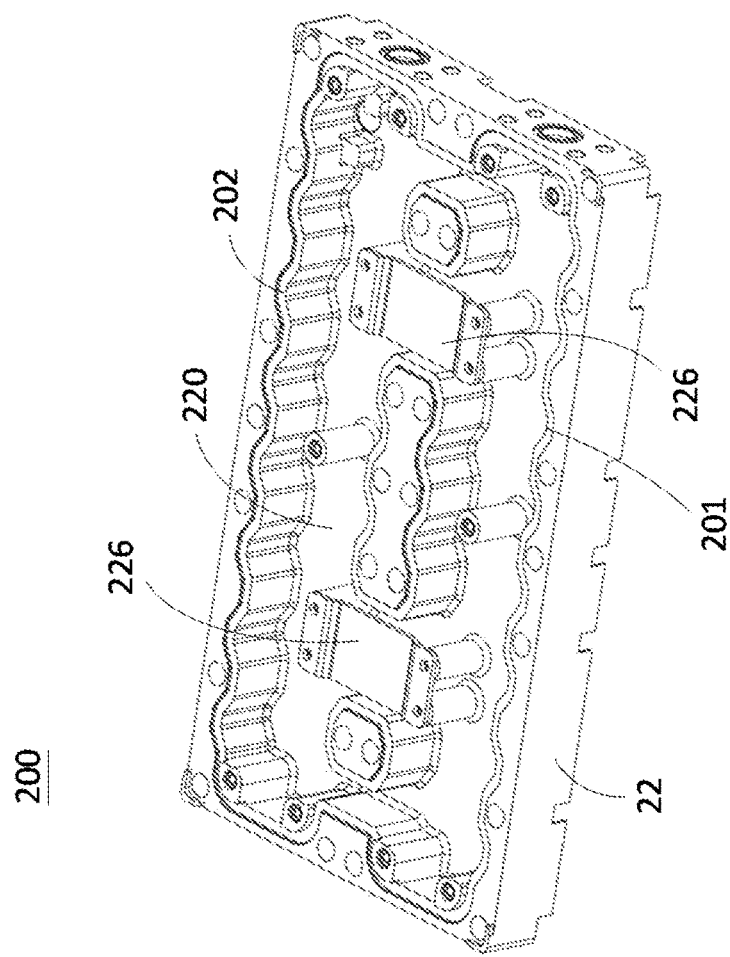
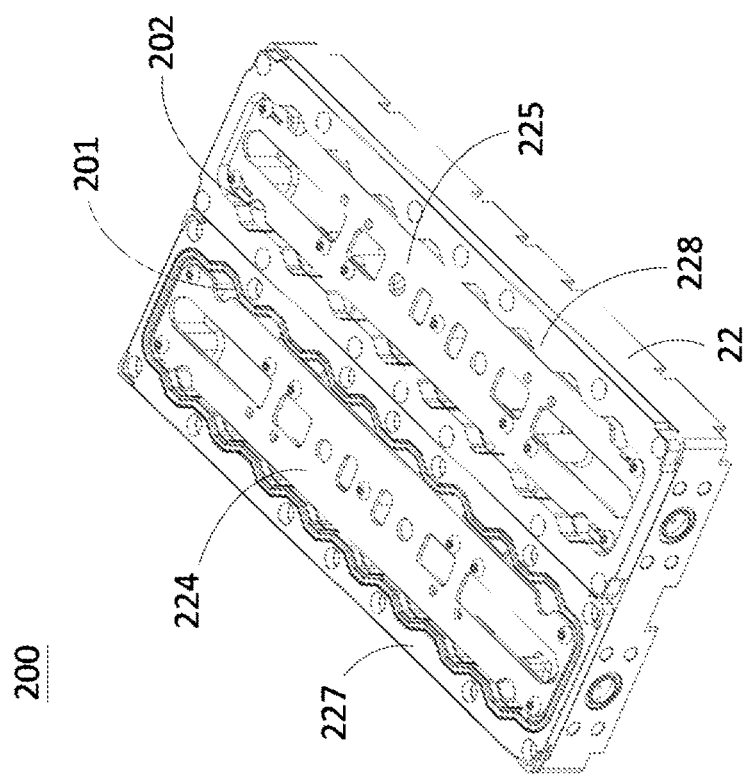
FIG. 9B
FIG. 9A

MODULAR BATTERY SYSTEMS AND BATTERY MODULES THEREOF

CROSS-REFERENCE TO RELATED APPLICATION(S)

The application is a continuation-in-part of U.S. patent application Ser. No. 16/388,282 ("'282 application"), filed on Apr. 18, 2019, and U.S. patent application Ser. No. 16/385,898 ("'898 application"), filed on Apr. 16, 2019. The content(s) of the '282 application and the '898 application are hereby fully incorporated herein by reference for all purposes.

FIELD

The present disclosure generally relates to battery systems, and more specifically, to modular battery systems and battery modules thereof.

BACKGROUND

U.S. Pat. No. 6,953,638 B2 discloses a conventional fluid-cooled battery pack system which can maintain the variation in battery temperature in a battery pack within the permissible temperature range even when the variation in the gaps between battery modules is considered. Each of a plurality of battery modules is provided with a plurality of convex portions and concave portions on the sides thereof, where the connections to other battery modules are made. When the battery modules are connected by bringing the opposite convex portions into contact with each other, coolant flow paths, through which a coolant flows, are formed. The target width of the coolant flow paths is set so that the variation in temperature relative to the target temperature of each battery module is maintained within a predetermined range when the coolant flows through the coolant flow paths, the variation in temperature is caused by a fabrication tolerance relative to the target width of the coolant flow paths between the battery modules.

U.S. patent application publication no. 2010/0092849 A1 discloses a conventional battery module which includes a housing configured to receive a plurality of cells. The housing includes a first tray and a second tray. Each of the plurality of cells is received within a depression of at least one of the first tray and the second tray.

SUMMARY

The present disclosure is directed to modular battery systems and battery modules thereof for submerging electrical contacts inside the modular battery system in the thermal management fluid in operation.

According to a first aspect of the present disclosure, a battery module including a peripheral sidewall, at least one battery cell and a first connector structure is provided. The peripheral sidewall defines a tubular space. The at least one battery cell is disposed in the tubular space. The first connector structure is disposed on a first edge of the peripheral sidewall and configured to fasten a first external module including a first open entrance to a first external space. The first edge defines a first opening of the tubular space. When the first connector structure fastens the first external module, a fluid channel is formed by joining the first opening and the first open entrance, and a shape of the fluid channel is defined by the tubular space, a shape of each of the at least one battery cell and the first external space.

In an implementation of the first aspect, the first external module further includes an electrode disposed at the first open entrance, and when the first connector structure fastens the first external module, at least one first terminal of the at least one battery cell is electrically coupled to the electrode via a conductive path located in the fluid channel.

In another implementation of the first aspect, the battery module further includes a thud sealing component disposed on the periphery sidewall along the first edge. The fluid sealing component is configured to create a liquid seal at an interface of the battery module and the first external module when the first connector structure fastens the first external module.

In another implementation of the first aspect, the battery module further includes a second connector structure disposed on a second edge of the peripheral sidewall. The second connector structure is configured to fasten a second external module including a second open entrance to a second external space. The second edge defining a second opening of the tubular space. When the first connector structure fastens the first external module and the second connector structure fastens the second external module, the fluid channel is formed by joining the first opening and the first open entrance and by joining the second opening and the second open entrance, and the channel shape of the fluid channel is defined by the tubular space, the shape of each of the at least one battery cell, the first external space and the second external space.

In another implementation of the first aspect, the battery module further includes a fluid sealing component disposed on the periphery sidewall along the second edge. The fluid sealing component is configured to create a liquid seal at an interface of the battery module and the second external module when the second connector structure fastens the second external module.

In another implementation of the first aspect, the first connector structure is adapted to the second connector structure.

In another implementation of the first aspect, when the first external module is a second battery module, the first external space is a tubular space defined by a peripheral sidewall of the second battery module, and the first open entrance is an opening defined by a sidewall edge of the second battery module. When the second external module is a third battery module, the second external space is a tubular space defined by a peripheral sidewall of the third battery module, and the second open entrance is an opening defined by a sidewall edge of the third battery module.

In another implementation of the first aspect, the battery module furthest includes a first electrode and a second electrode. The first electrode is electrically coupled to at least one first terminal of the at least one battery cell and disposed in the first opening. The second electrode is electrically coupled to at least one second terminal of the at least one battery cell and disposed in the second opening. When the first connector structure fastens the second battery module, the first electrode is electrically coupled to a third electrode of the second battery module while the first electrode and the third electrode are located in the fluid channel. When the second connector structure fastens the third battery module, the second electrode is electrically coupled to a fourth electrode of the third battery module while the second electrode and the fourth electrode are located in the fluid channel.

In another implementation of the first aspect, the battery module further includes a conductive elastic component electrically coupled to the first electrode. When the first connector structure fastens the second battery module, the first electrode is electrically coupled to the third electrode of the second battery module via the conductive elastic component while the first electrode, the third electrode and the conductive elastic component are located in the fluid channel.

In another implementation of the first aspect the battery module further includes a first electrode electrically coupled to at least one first terminal of the at least one battery cell and disposed in the first opening.

In another implementation of the first aspect, the first electrode is a first electrode plate contacting the at least one first terminal of the at least one battery cell, the first electrode plate includes a plurality of passing holes, and when the first connector structure fastens the first external module, the shape of the fluid channel is further defined by the tubular space, the shape of each of the at least one battery cell, the shape of the plurality of passing holes and the first external space.

In another implementation of the first aspect, the first electrode plate further includes a plate body, at least one contact pad and at least one fusible rib. The plate body is formed with at least one through bore in positions corresponding to the at least one first terminal. The at least one contact pad is disposed in each of the at least one through bore and electrically contacting the at least one first terminal. The at least one fusible rib each linking one of the at least one contact pad to the plate body. A melting point of the at least one fusible rib is lower than both a melting point of the plate body and a melting point of the contact pad.

In another implementation of the first aspect, the battery module further includes a conductive elastic component electrically coupled the first electrode. The first external module further includes a second electrode disposed in the first open entrance. When the first connector structure fastens the first external module, the first electrode is electrically coupled to the second electrode via the conductive elastic component while the first electrode, the second electrode and the conductive elastic component are located in the fluid channel.

In another implementation of the first aspect, the battery module further includes a second connector structure and a second electrode. The second connector structure is disposed on a second edge of the peripheral sidewall and configured to fasten a second external module comprising a second open entrance to a second external space. The second edge defines a second opening of the tubular space. The second electrode is electrically coupled to a second terminal of each of the at least one battery cell and disposed in the second opening.

In another implementation of the first aspect, the first electrode is a first electrode plate contacting the at least one first terminal of the at least one battery cell. The first electrode plate includes a plurality of first passing holes. When the first connector structure fastens the first external module, the channel shape of the fluid channel is further defined by the tubular space, the shape of each of the at least one battery cell, the shape of the plurality of first passing holes and the first external space. The second electrode is a second electrode plate contacting the at least one second terminal of the at least one battery cell. The second electrode plate includes a plurality of second passing holes. When the second connector structure fastens the second external module, the channel shape of the fluid channel is further defined by the tubular space, the shape of each of the at least one battery cell, the shape of the plurality of second passing holes and the second external space.

In another implementation of the first aspect, the first electrode plate further includes a plate body, at least one contact pad and at least one fusible rib. The plate body is formed with at least one through bore in positions corresponding to the at least one first terminal. The at least one contact pad is disposed in each of the at least one through bore and electrically contacting the it least one first terminal. Each of the at least one fusible rib links one of the at least one contact pad to the plate body. A melting point of the at least one fusible rib is lower than both a melting point of the plate body and a melting point of the contact pad.

According, to a second aspect of the present disclosure, a modular battery system is provided. The modular battery system includes a plurality of battery modules, a first management module and a second management module. The battery modules are connected in series and including a head battery module and a tail battery module. The first management module is connected to the head battery module and includes a first housing and a first fluid feedthrough. The first housing defines a first inner chamber. The first fluid feedthrough is disposed in the first housing and configured as an inlet of a temperature managing fluid. The second management module is connected to the tail battery module and includes a second housing and a second fluid feedthrough. The second housing defines a second inner chamber. The second fluid feedthrough is disposed in the second housing and configured as an outlet of the temperature managing fluid. A fluid channel is formed such that the temperature managing fluid flows from the first fluid feedthrough into the modular battery system, flows through the fluid channel including flowing through the first inner chamber, a plurality of tubular spaces of the plurality of battery modules and the second inner chamber, and flows out of the modular battery system from the second fluid feedthrough.

In an implementation of the second aspect, the battery modules include a first waist batter module and a second waist battery module. The modular battery system further includes an interconnection module including a housing defining an interconnection space. The interconnection space includes a first open entrance and a second open entrance. The first waist battery module is connected to the interconnection module at the first open entrance and the second waist battery module is connected to the interconnection module at the second open entrance. Flowing through the fluid channel further comprises flowing through the interconnection space.

In another implementation of the second aspect, the first open entrance and the second open entrance are in different directions.

In another implementation of the second aspect, the interconnection module further includes a first part electrode and a second part electrode. The first part electrode is disposed in the first open entrance. The second part electrode is disposed in the second open entrance and electrically coupled to the first part electrode via a conductive path inside the interconnection module. When the first waist battery module connects to the interconnection module at the first open entrance, at least one first terminal of the at least one battery cell of the first waist battery module is electrically coupled to the second part electrode via the first part electrode and the conductive path. When the second waist battery module connects to the interconnection module at the second open entrance, at least one second terminal of the at least one battery cell of the second waist battery module is electrically coupled to the first part electrode via the second part electrode and the conductive path.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

FIG. 4 is a top view illustrating a battery module according to an example implementation of the present application.

FIG. 5 is a side view illustrating a battery module according to an example implementation of the present application.

FIG. 9A is a perspective view illustrating an interconnection module according to an example implementation of the present application.

FIG. 9B is a perspective view illustrating a part of an interconnection module according to an example implementation of the present application.

DESCRIPTION

Figure 1A:
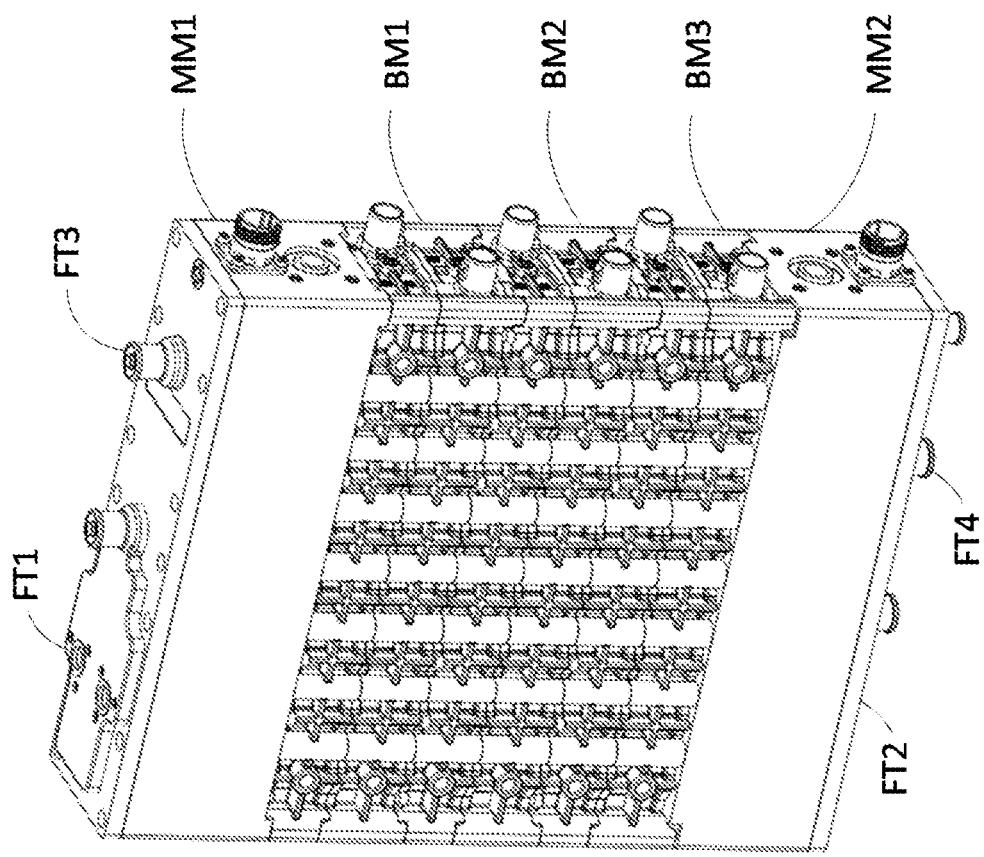
FIG. 1A is a perspective view illustrating a modular battery system according to an example implementation of the present application.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms nay be used in the specification and claims to describe portions of the present disclosure (e.g., front, rear, left, right, top, bottom, etc.). These directional definitions are intended to merely assist, in describing and claiming the disclosure and are not intended to limit the disclosure in any way.

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Figure 1B:
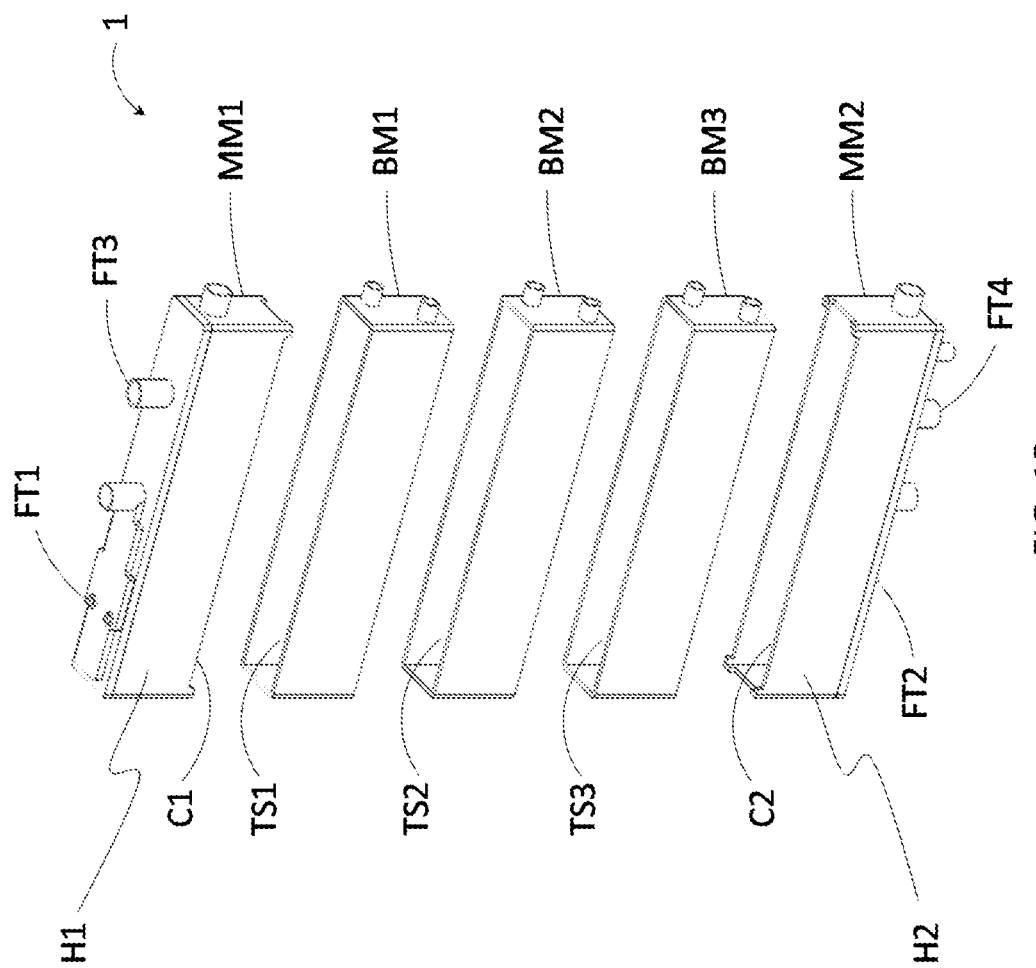
FIG. 1B is a schematic exploded view illustrating a modular battery system according to an example implementation of the present application.

FIG. 1A is a perspective view illustrating a modular battery system 1 according to an example implementation of the present application; FIG. 1B is a schematic exploded view illustrating the modular battery system 1 according to an example implementation of the present application.

Referring to FIG. 1A, a modular battery system 1 includes a plurality of battery modules BM1, BM2, BM3, and at least two management modules MM1, MM2. The modular battery system 1 functions as a battery, the battery modules BM1, BM2, BM3 function as a plurality of sub-batteries connected in series, and the management modules MM1, MM2 function as two terminals (e.g., anode and cathode) of the battery. Specifically the battery modules BM1, BM2, BM3 may be mechanically and electrically coupled to each other (e.g., in series) to form a battery string, where the battery module BM1 may be considered to be a head battery module BM1 and the battery module BM3 may be considered to be a tail battery module BM3. As the terminals of the battery, the management modules MM1, MM2 mechanically and electrically coupled to the head battery module BM1 and the tail battery module BM3, respectively.

It is noted that the number of battery modules included in the modular battery system 1 is not limited in the present application. In some implementations, there may be only one battery module in the battery string of which two sides are capped with the management modules MM1, MM2. Therefore, the only battery module in the battery string may be referred to as a head battery module and a tail battery module simultaneously. In some implementations, there may be two battery modules in the battery string that are one head battery module and one tail battery module. In some implementations, there may be more than three battery modules in the battery string. In some implementations, different models of the battery module may be provided for providing different voltages. Advantageously, various required voltages can be provided by selecting appropriate number and/or model of the battery modules in the battery string.

For various reasons, the junctions or contacts electrically coupling said modules may heat up when electrical currents flow through and as such the output voltage of the modular battery systems may drop significantly. In order to improve the heat dissipation efficiency, in implementations of the present application, modules used in the modular battery systems are designed such that the junctions or contacts electrically coupling said modules can be submerged in the temperature management fluid in operation of the modular battery systems.

Referring to FIG. 1B, in some implementations, each of the battery modules BM1, BM2, BM3 may be designed in form of a tube having an internal tubular space TS1, TS2, TS3, and two openings at two ends of the tubular space TS1, TS2, TS3. Functional elements such as battery cells are disposed in the tubular space TS1, TS2, TS3, and the specific way for disposing) the battery cells in the tubular space TS1, TS2, TS3 is not limited herein. In such design, the battery modules BM1, BM2, BM3 may be connected to each other (e.g., in series) and become a battery string in form of a longer tube than that of an individual battery module, as shown in FIGS. 1A and 1B. Once fluids be fed into the battery string, it can freely flow to anywhere in the tubular spaces TS1, TS2, TS3 not occupied by said functional elements of the battery module BM1, BM2, BM3, and advantageously, said functional elements can be submerged in the fluids.

In other words, once the battery modules BM1, BM2, BM3 are connected together, a fluid channel is formed therein, and the shape of the fluid channel is defined by the tubular spaces TS1, TS2, TS3 of the connected battery modules BM1, BM2, BM3 and the shape of the functional elements therein.

Further detailed examples of the battery module BM1, BM2, BM3 and the functional elements therein will be described in the following descriptions.

In some implementations, each of the management modules MM1, MM2 may include a housing H1, H2 which defines an inner chamber C1, C2, and a fluid feedthrough FT1, FT2 disposed on the housing C1, C2. The management module MM1 may cap the head battery module BM1 and the management module MM2 may cap the tail battery module BM3. Specifically, the management module MM1 may mechanically couple to the head battery module BM1 in order to seal one opening (i.e., the opening at one end) of the battery string, and the management module MM2 may mechanically couple to the tail battery module BM3 in order to seal another opening (i.e., the opening at another end) of the battery string. In this way, the modular battery system 1 may be assembled as a capsule as shown in FIGS. 1A and 1B. Once fluids be fed into the capsule, it can freely flow to anywhere in the inner chambers C1, C2, the tubular spaces TS1, TS2, TS3 not occupied by said functional elements of the battery module BM1, BM2, BM3, and advantageously, said functional elements can be submerged in the fluids.

In some implementations, one of the fluid feedthroughs FT1, FT2 may function as an inlet of a thermal management fluid and another one of the fluid feedthroughs FT1, FT2 may function as an outlet of the thermal management fluid. Specifically, the thermal management fluid may be fed into the modular battery system 1 through the inlet and may flow out the modular battery system 1 through the outlet. More specifically, once the management modules MM1, MM2 are capped on both ends of the battery string including the battery modules BM1, BM2 and BM3, a fluid channel is formed such that a temperature managing fluid is capable of flowing from the fluid feedthrough FT1 into the modular battery system 1, flowing through the fluid channel formed by the inner chamber C1, the tubular spaces TS1, TS2, TS3, and the inner chamber C2, and flowing out the modular battery system 1 from the fluid feedthrough FT2. Advantageously, circulation of the thermal management fluid may be achieved.

In some implementations, the thermal management fluid may be an inert dielectric fluid and may provide a fire suppression capability. For example, the thermal management fluid may be, but is not limited to, mineral oil, silicone oil, ester-based oil, or engineered fluid, etc.

In some implementations, each of the management modules MM1, MM2 may further include at least one electrical feedthrough and an electrode coupled to the at least one electrical feedthrough FT3 and FT4. For example, the at least one electrical feedthrough FT3 and FT4 may include a power feedthrough, which electrically coupled to the electrode for electrically coupling to a terminal electrode of the battery string (e.g., electrically coupling to an electrode of the head battery module BM1 or an electrode of the tail battery module BM3). In this way, the power feedthroughs of the management modules MM1, MM2 may function as two terminals (e.g., an anode and a cathode) of the modular batter system 1. For another example, the at least one electrical feedthrough FT3 and FT4 may include instrument feedthrough, which carries the electronical signals (e.g., sense signals) for communicating between both sides of the housing H1, H2.

Further detailed examples of the management modules may be found at least in the US patent application publication with publication number of US 2020/0335830A1, therefore which is not repeated herein.

It should be noted that, except for at least one battery cell disposed in the tubular space TS1, TS2, TS3 of each battery module BM1, BM2, BM3, the types and numbers of other functional elements disposed in the tubular spaces TS1, TS2, TS3 and the inner chambers C1, C2 are not limited in the present application. The skilled person may place other elements such as electrodes, sensors and/or fixtures in the tubular spaces TS1, TS2, TS3 and/or the inner chambers C1, C2 as their needs.

Figure 2:
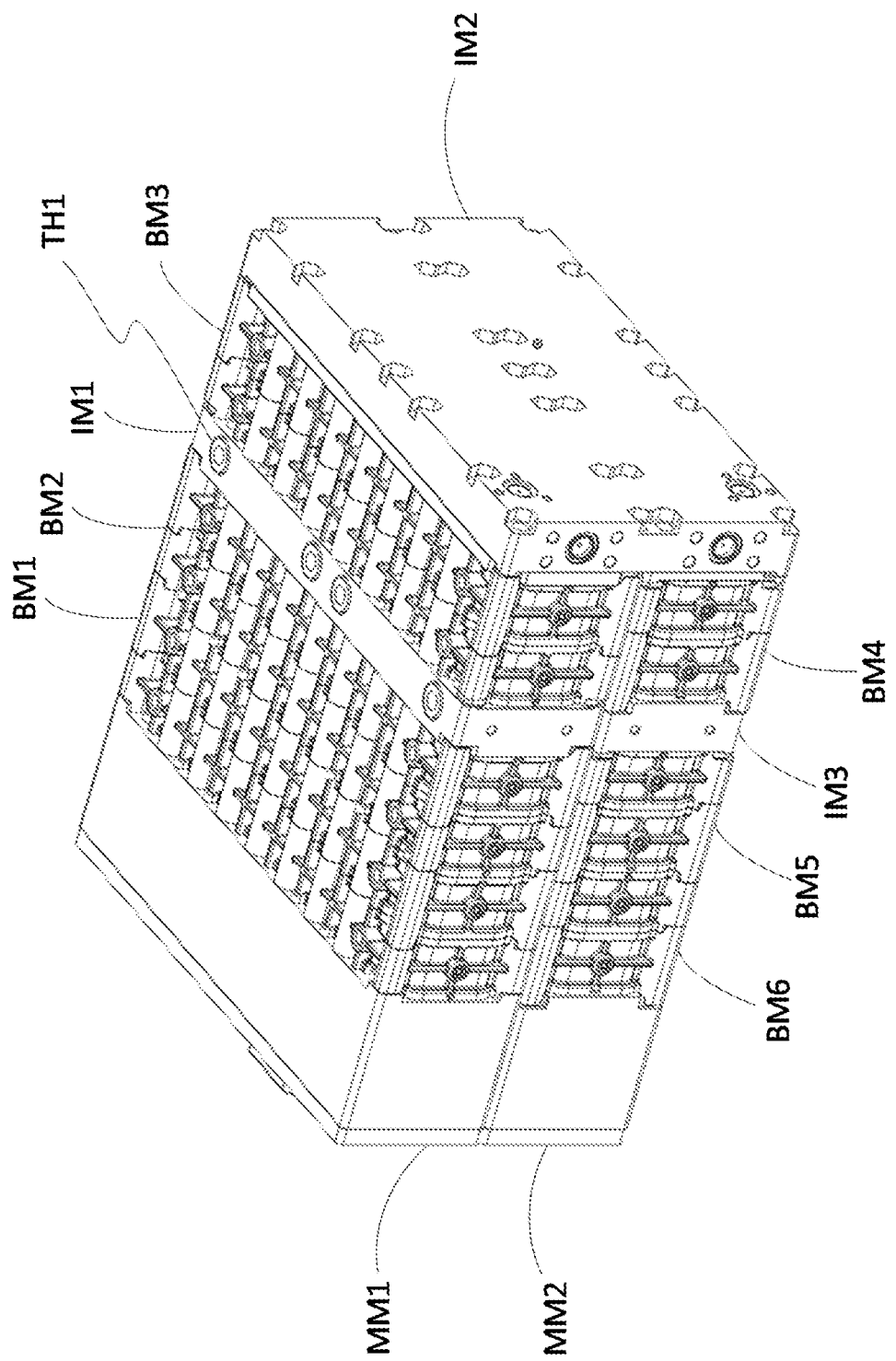
FIG. 2 is a perspective view illustrating a modular battery system according to another example implementation of the present application.

FIG. 2 is a perspective view illustrating a modular battery system according to another example implementation of the present application.

Referring to FIG. 2, a modular battery system 2 includes a plurality of battery modules BM1 to BM6, at least two management modules MM1, MM2, and at least one interconnection module IM1, IM2, IM3. Similar to the modular battery system 1 illustrated in FIG. 1, the modular battery system 2 functions as a battery, the battery modules BM1 to BM6 function as a plurality of sub-batteries connected in series, and the management modules MM1, MM2 function as two terminals (e.g., anode and cathode) of the battery. The battery modules BM1 to BM6 of the modular battery system 2 are similar to the battery module BM1 to BM3 of the modular battery system 1, and the management modules MM1, MM2 of the modular battery system 2 are similar to the management modules MM1, MM2 of the modular battery system 1, therefore which are not repeated herein.

Comparing with the modular battery system 1, the modular battery system 2 as shown in FIG. 2 further includes the interconnection modules IM1, IM2, IM3 in the battery string. Specifically, the battery string of the modular battery system 2 from head to tail sequentially includes the head battery module BM1 the interconnection module IM1, the battery modules BM2, BM3, the interconnection module IM2, the battery module BM4, BM5, the interconnection module IM3 and the tail battery module BM6.

Each of the interconnection modules IM1, IM2, IM3 may include a housing defining an interconnection space having at least two open entrances, and function as a relay of currents of both electricity and fluid in the battery string. In light of this, a battery module connected to the interconnection module may also be referred to as a waist battery module. In such definition, it should be noted that a battery module referred to as a waist battery module may also be referred to as a head battery module or a tail battery module. Therefore, each of the battery modules BM1 to BM6 may be referred to as a waist battery module of the battery string in the modular battery system 2.

As a relay of current of fluid (e.g., thermal management fluid), each of the interconnection module IM1, IM2, IM3 may be connected to two waist battery modules at the two open entrances of the associated interconnection module, and as such a fluid channel may be formed with respect to each of the interconnection module IM1, IM2, IM3. The channel shape of each fluid channel may be defined by two tubular spaces of the two waist battery modules connected to the associated interconnection module, the interconnection space of the associated interconnection module, and every element (e.g., the battery cells) disposed in said two tubular spaces and the interconnection space of the associated interconnection module.

As a relay of current of electricity (i.e., electric current), each of the interconnection module IM1, IM2, IM3 includes at least two electrodes correspondingly disposed at the at least two open entrances to the interconnection space, and the at least two electrodes are electrically coupled together is a conductive path inside the interconnection space. As such in a case that an electrode of a battery module is electrically couple to one of the at least two electrodes of an interconnection module IM1, IM2 or IM3, the electrode of the battery module is also electrically coupled to the other electrodes of the interconnection module IM1, IM2 or IM3, via the conductive path inside the interconnection space of the interconnection module IM1, IM2 or IM3. In operation, said electrodes and the conductive path are all submerged in the thermal management fluid since the interconnection modules IM1, IM2, IM3 relay both the thermal management fluid and the electric current.

For example, a first waist battery module BM1 connects to the interconnection module IM1 at the open entrance facing the first waist battery module BM1, and a second waist battery module BM2 connects to the interconnection module IM1 at the open entrance facing the second waist battery module BM2. Thus, a fluid channel is formed, and the channel shape is defined by the tubular space of the battery module BM1, the interconnection space of the interconnection module IM1 and the tubular space of the battery module BM2 and every element disposed in said tubular spaces and interconnection space. Furthermore, an electrode of the first waist battery module BM1 that contacts an electrode of the interconnection module IM1 disposed at the open entrance facing the first waist battery module BM1 is electrically coupled to an electrode of the second waist battery module BM2 that contacts another electrode of the interconnection module IM1 disposed at the open entrance facing the second waist battery module BM2 via the electrodes and the conductive path of the interconnection module IM1. In operation, the thermal management fluid may flow from the tubular space of the battery module BM1 into the interconnection space of the interconnection module IM1 through the first open entrance, and flow from the interconnection space of the interconnection module IM1 into the tubular space of the battery module BM2 through the second open entrance, while every element disposed in said tubular spaces (e.g., battery cells) and interconnection space (e.g., electrodes and conductive path connecting the electrodes) are submerged in the thermal management fluid. In this case, the interconnection module IM1 may be used for extending the fluid channel of the battery string.

For another example, a first waist battery module BM3 connects to the interconnection module IM2 at the open entrance facing the first waist battery module BM3, and a second waist) battery module IM4 connects to the interconnection module IM2 at the open entrance facing the second waist battery module BM4. Thus, a fluid channel is formed, and the channel shape is defined by the tubular space of the battery module BM3, the interconnection space of the interconnection module IM2 and the tubular space of the battery module BM4 and every element disposed in said tubular spaces and interconnection space. Furthermore, an electrode of the first waist battery module BM3 that contacts an electrode of the interconnection module IM2 disposed at the open entrance facing the first waist battery module BM3 is electrically coupled to an electrode of the second waist battery module BM4 that contacts another electrode of the interconnection module IM2 disposed at the open entrance facing the second waist battery module BM4 via the electrodes and the conductive path of the interconnection module IM2. In operation, the thermal management fluid may flow from the tubular space of the battery module BM3 into the interconnection space of the interconnection module IM2 through the first open entrance, and flow from the interconnection space of the interconnection module IM2 into the tubular space of the battery module BM4 through the second open entrance, while every element disposed in said tubular spaces (e.g., battery cells) and interconnection space (e.g., electrodes and conductive path connecting the electrodes) are submerged in the thermal management fluid. In this case, the interconnection module IM2 may be used for folding the battery string.

It should be further noted that two open entrances to an interconnection space of an interconnection module may be configured in arbitrary directions. In some implementations, the two open entrances to the interconnection space of the interconnection module may face to the same directions (e.g., the interconnection module IM2), and the interconnection module may be used for folding the battery string in this case. In some implementations, the two open entrances to the interconnection space of the interconnection module may face to opposite directions (e.g., the interconnection modules IM1, IM3), and the interconnection module may be used for extending the battery string in this case. In some implementations, the two open entrances to the interconnection space of the interconnection module may face to two directions having an included angle of 90 or any other degrees, and the interconnection module may be used for bending the battery string in this case. Advantageously, the modular battery system may be assembled into any required shape by selecting appropriate interconnection modules.

In some implementations, the surface profile of the housing of the interconnection module may be designed as required. For example, the housing may have at least one through) hole TH1 as the interconnection module IM1 shown in FIG. 2. At least one through hole (not shown in FIG. 2) may be designed on the housing of the interconnection module IM3 (e.g., corresponding to the through hole TH1). The at least one through hole TH1 may function as a handle of the modular battery module 2 or a channel configured for a bracket that supports the modular battery module 2. However, the surface profile of the housing of the interconnection module is not limited in the present application.

Further detailed examples of the interconnection module IM1 to IM3 will be described in the following descriptions.

Figure 3:
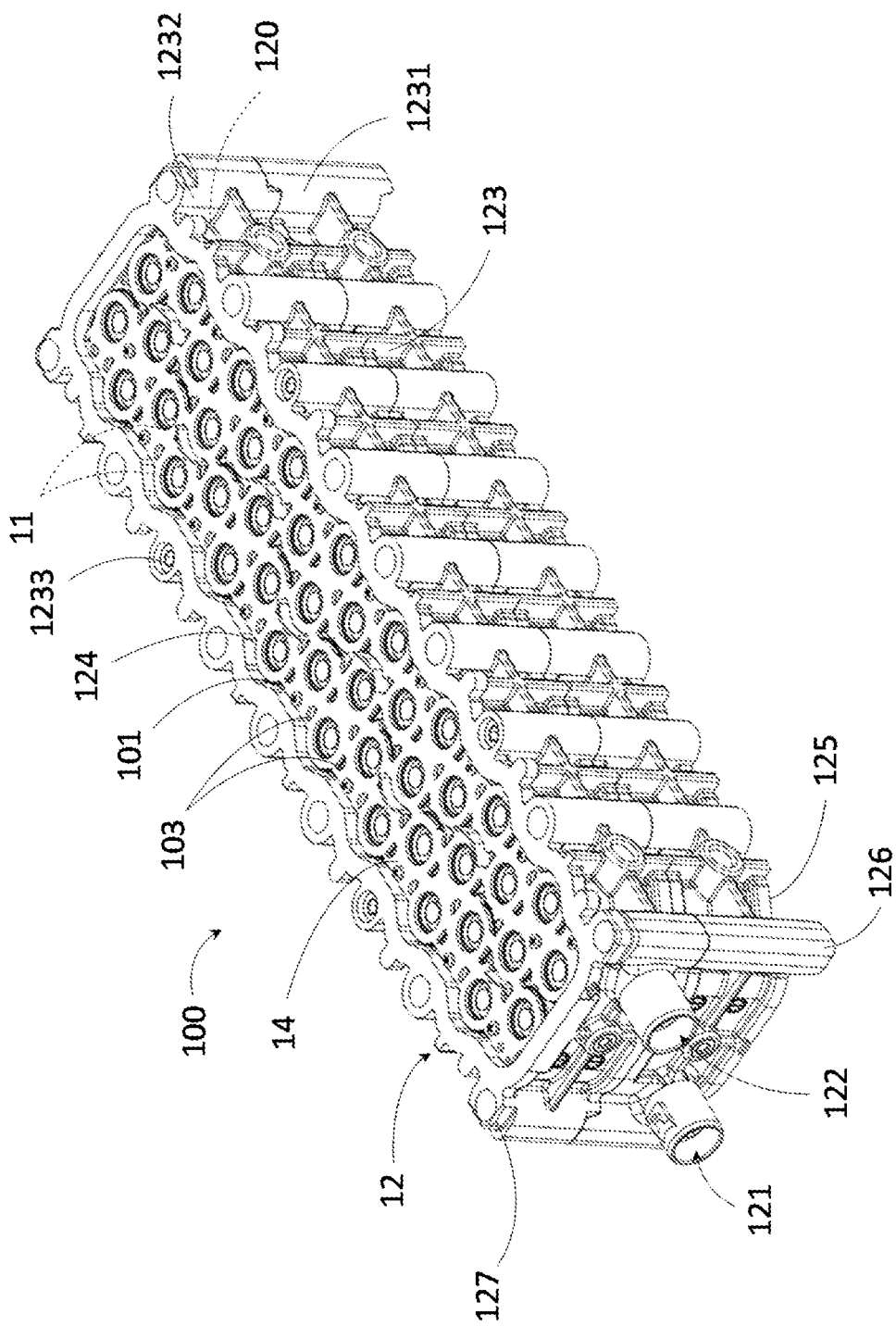
FIG. 3 is a perspective view illustrating a battery module according to an example implementation of the present application.
Figure 6:
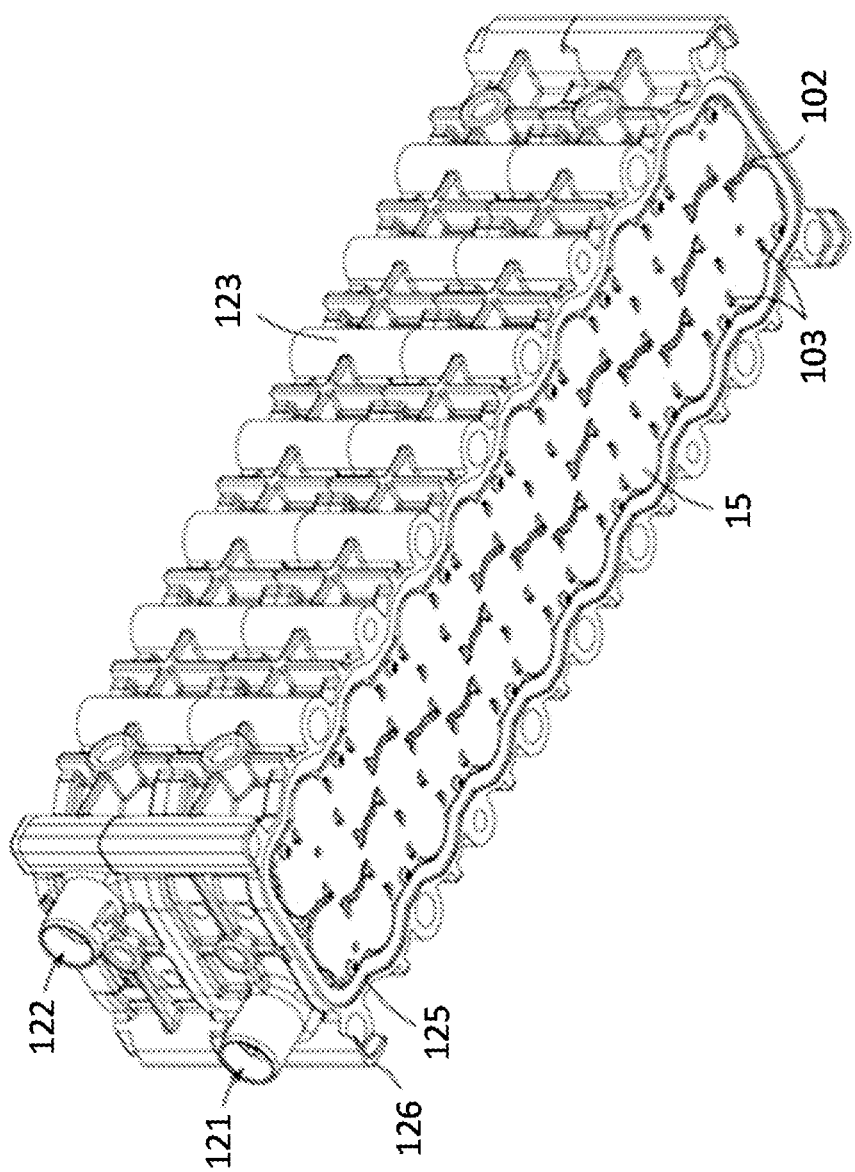
FIG. 6 is a bottom view illustrating a battery module according to an example implementation of the present application.

FIG. 3 is a perspective view illustrating a battery module according to an example implementation of the present application; FIG. 4 is a top view illustrating a battery module according to an example implementation of the present application; FIG. 5 is a side view illustrating a batter module according to an example implementation of the present application; and FIG. 6 is a bottom view illustrating a battery module according to an example implementation of the present application. The battery modules BM1 to BM6 as shown in FIG. 1 and FIG. 2 may be implemented according to the battery module 100 in the following example implementations.

Referring to FIGS. 3 to 6, a battery module 100 includes at least one battery cell 11 and an outer casing 12. Specifically, the outer casing 12 includes a peripheral sidewall 123 which defines a tubular space 120 having two openings 101, 102, and the at least one battery cell 11 are disposed in the tubular space 120.

In some implementations, a plurality of battery cells 11 are included in the battery module 100, and the plurality of battery cells 11 may be arranged in multiple rows, as shown in FIG. 3. Each of the battery cells 11 may have a cell body 110 extending in an upright direction (Z), and the battery cells 11 of each row may be staggered with the battery cells 11 of an adjacent row. Each of the battery cells 11 may have a first terminal 111 and a second terminal 112 which are opposite to each other in the upright direction (Z). One of the first and second terminals 111, 112 is a positive terminal (e.g., anode), and the other of the first and second terminals 111, 112 is a negative terminal (e.g., cathode). Each battery cell 11 in a may be a rechargeable battery, for example, but not limited to, a Nickel-Cadmium (NiCd) batten Nickel-metal-hydride (NiMH) battery, or a Lithium-ion battery. In some embodiments, the battery cells 11 may be cylindrical Lithium ion 18650 cells or 21700 cells.

In some implementations, the outer casing 12 defines therein a tubular space 120 for accommodation of the battery cells 11 and the tubular space 120 has a first opening 101 (see FIGS. 3 and 4) and a second opening 102 (see FIG. 5) configured to permit a thermal management fluid to flow through the tubular space 120 from one of the first and second openings 101, 102 to the other one of the first and second openings 101, 102 so as to allow functional elements such as the battery cells 11 to be cooled by the thermal management fluid, for example.

Referring to FIGS. 3 and 6, the outer casing 12 may include as peripheral sidewall 123 which defines the tubular space 120. The peripheral side all 123 may, for example, extend in the upright direction (Z), to terminate at a first wall edge 124 and a second wall edge 125. The first wall edge 124 may define the first opening 101 by surrounding the first opening 101 and the second wall edge 125 may define the second opening 102 by surrounding the second opening 102.

In addition, the outer casing 12 may include a first connector structure 127 which is disposed on the first wall edge 124. The first connector structure 127 may be configured to fasten another module (e.g., a first external module). Specifically, the another module (e.g., the first external module) may include a first open entrance to a first space external to the battery module 100, the first connector structure 127 disposed on the first wall edge 124 may fasten the another module (e.g., the first external module) such that the first opening 101 joins the first open entrance of the another module (e.g., the first external module). As such, a fluid channel may be formed in the battery module 100 and the another module (e.g. the first external module). Elements in the tubular space 120 such as the battery cells 11 are located in the fluid channel, therefore a channel shape of the fluid channel may be defined by the tubular space 120, the shape of the battery cells 11 and said first space external to the battery module 100. It is noted that any element located in the fluid channel would be submerged in the thermal management fluid in operation of the modular battery system (e.g., modular battery system 1 or 2 as shown in FIG. 1 or 2) includes the battery module 100 Said another module (e.g., the first external module) may be, for example, another battery module 100, a management module, or an interconnection module, but which is not limited herein.

In some implementations, the battery module 100 may include a first electrode plate 14 which is electrically coupled to the first terminals 111 of the battery cells 11 as shown in FIGS. 3 to 5, where the first electrode plate 14 may be disposed at the first opening 181. For example, the first electrode plate 14 may be fitted in the first opening 101 and include a plurality of passing holes 183 on it as shown in FIG. 4, but which is not limited in the present application.

If the another module (e.g., the first external module) includes a first electrode at the first open entrance, the first terminals 111 of the battery module 100 may be electrically coupled to the first electrode of the another module (e.g., the first external module) via a conductive path including the first electrode plate 14 when the first connector structure 127 fastens the another module (e.g., the first external module). In this case, all of the battery cells 11, the first electrode plate 14, the first electrode of the another module and the conductive path may be located in the fluid channel. Advantageous, all the elements though which the electric current flows may be submerged in the thermal management fluid in operation.

In some implementations, the battery module 100 may further include a conductive elastic component (not shown) disposed on the first electrode plate 14, and the conductive path may further include the conductive elastic component. In this case, the conductive elastic component may also be located in the fluid channel. Advantageous, elasticity of the conductive elastic component may prevent the conductive path from breakage due to undesired vibration. In some implementations, the conductive elastic component ma be a conductive spring. In some implementations, the conductive elastic component may be formed by the first electrode plate 14. For example, part of the first electrode plate 14 may be bent into a curl shape to make it elastic.

In some implementations, a fluid sealing component may be disposed on the periphery sidewall 123 along the first wall edge 124 to create liquid seal at an interface of the battery module 100 and the another module (e.g., the first external module). The fluid sealing component is configured to prevent leakage of the thermal management fluid in operation of the modular battery system that includes the battery module 100. However, the specific configuration and the material thereof are not limited herein.

In some implementations, except for the first connector structure 127 disposed on the first wall edge 124, the outer casing 12 may further include a second connector structure 126 which is disposed on the second wall edge 125, and the second connector structure 126 is adapted to the first connector structure 127. The second connector structure 126 is configured to fasten a still another module (e.g., a second external module). Specifically, the still another module (e.g., the second external module) may include a second open entrance to a second space external to the battery module 100, the second connector structure 126 disposed on the second wall edge 125 may fasten the still another module (e.g., the second external module) such that the second opening 102 joins the second open entrance of the still another module (e.g., the second external module). If the battery module 100 fastens two external modules (e.g., the first external module and the second external module) on both sides, a fluid channel may be formed in the battery module 100, the another module (e.g., the first external module) and the still another module (e.g., the second external module), where a channel shape of the fluid channel may be defined by the tubular space 120, the shape of the battery cells 11, and said first and second spaces external to the battery module 100. Said still another module (e.g., the second external module) may be, for example, another battery module 100, a management module, or an interconnection module, but which is not limited herein.

In some implementations, the battery module 100 may further include a second electrode plate 15 which is electrically coupled to the second terminals 112 of the battery cells 11 as shown in FIGS. 5 and 6, where the second electrode plate 15 may be disposed at the second opening 102. For example, the second electrode plate 15 may be fitted in the second opening 102 and include a plurality of passing holes 103 on it as shown in FIG. 6, but which is not limited in the present application.

If the still another module (e.g., the second external module) includes a second electrode at the second open entrance, the second terminals 112 of the battery module 100 may be electrically coupled to the second electrode of the still another module (e.g., the second external module) via a conductive path including the second electrode plate 15 when the second connector structure 126 fastens the still another module (e.g., the second external module). In this case, all of the battery cells 11, the second electrode plate 15, the second electrode of the still another module and the conductive path may be located in the fluid channel. As described before, all the elements though which the electric current flows may be submerged in the thermal management fluid in operation.

In some implementations, the battery module 100 may further include a conductive elastic component (not shown) disposed on the second electrode plate 15, and the conductive path may further include the conductive elastic component. In this case, the conductive elastic component may also be located in the fluid channel. As described before, elasticity of the conductive elastic component may prevent the conductive path from breakage due to undesired vibration. In some implementations, the conductive elastic component may be a conductive spring. In some implementations, the conductive elastic component may be formed by the second electrode plate 15. For example, part of the second electrode plate 15 may be bent into a curl shape to make it elastic.

In some implementations, a fluid sealing component may be disposed on the periphery sidewall 123 along the second wall edge 125 to create liquid seal at an interface of the battery module 100 and the still another module (e.g., the second external module). The fluid sealing component is configured to prevent leakage of the thermal management fluid in operation of the modular battery system that includes the battery module 100. However, the specific configuration and the material thereof are not limited herein.

In some implementations, two battery modules 100 may be assembled together by connecting the first connector structure 127 of one battery module 100 and the second connector structure 126 of another battery module 100. For example, the first connector structure 127 may be a female edge extension and the second connector structure may be a male edge extension which respectively extend from the first and second wall edges 124, 125 as shown in FIG. 3.

Referring to FIG. 3, in some implementations, the peripheral sidewall 123 may have a first surrounding segment 1231 and a second surrounding segment 1232 which is secured to the first surrounding segment 1231 through a plurality of bolts 1233. Alternatively, the first and second surrounding segments 1231, 1232 may be secured to each other by welding or bonding using an adhesive material. In some implementations, at least one port may be form on the peripheral sidewall 123. For example, a first port 121 may be formed in the first surrounding segment 1231 and a second port 122 may be formed in the second surrounding segment 1232. For another example, the first and second ports 121, 122 may be formed in the same one of the first and second surrounding segments 1231, 1232. The at least one port may be, for example, configured with instrument feedthrough(s), but which is not limited herein. The peripheral sidewall 123 and the outer casing 12 may be, for example, made from a plastic or polymer materials, but which is not limited herein.

Referring to FIG. 4, in some implementations, the first electrode plate 14 may include a plate body 141, a plurality of contact pads 143, and a plurality of fusible ribs 145 disposed in a plurality of fusible regions 144. Specifically, the plate body 141 may be formed with a plurality of through bores 142 in positions corresponding to the first terminals 111 of the battery cells 11. The contact pads 143 may be disposed respectively in the through bores 142 to be in electrical contact with the first terminals 111 of the battery cells 11, respectively. The fusible regions 144 may be located respectively in the through bores 142, and each of the fusible regions 144 may include at least one fusible rib 145 which links the respective contact pad 143 to the plate body 141 for electrically connecting the plate body 141 and the respective contact pad 143. The melting point of the fusible ribs 145 is, for example, lower than the melting point of the plate body 141 and the contact pads 143. Advantageously, when one of the battery cells 11 is overheated, at least one fusible rib 145 of the corresponding fusible region 144 may melt for protection of the remaining battery cells 11.

Figure 7:
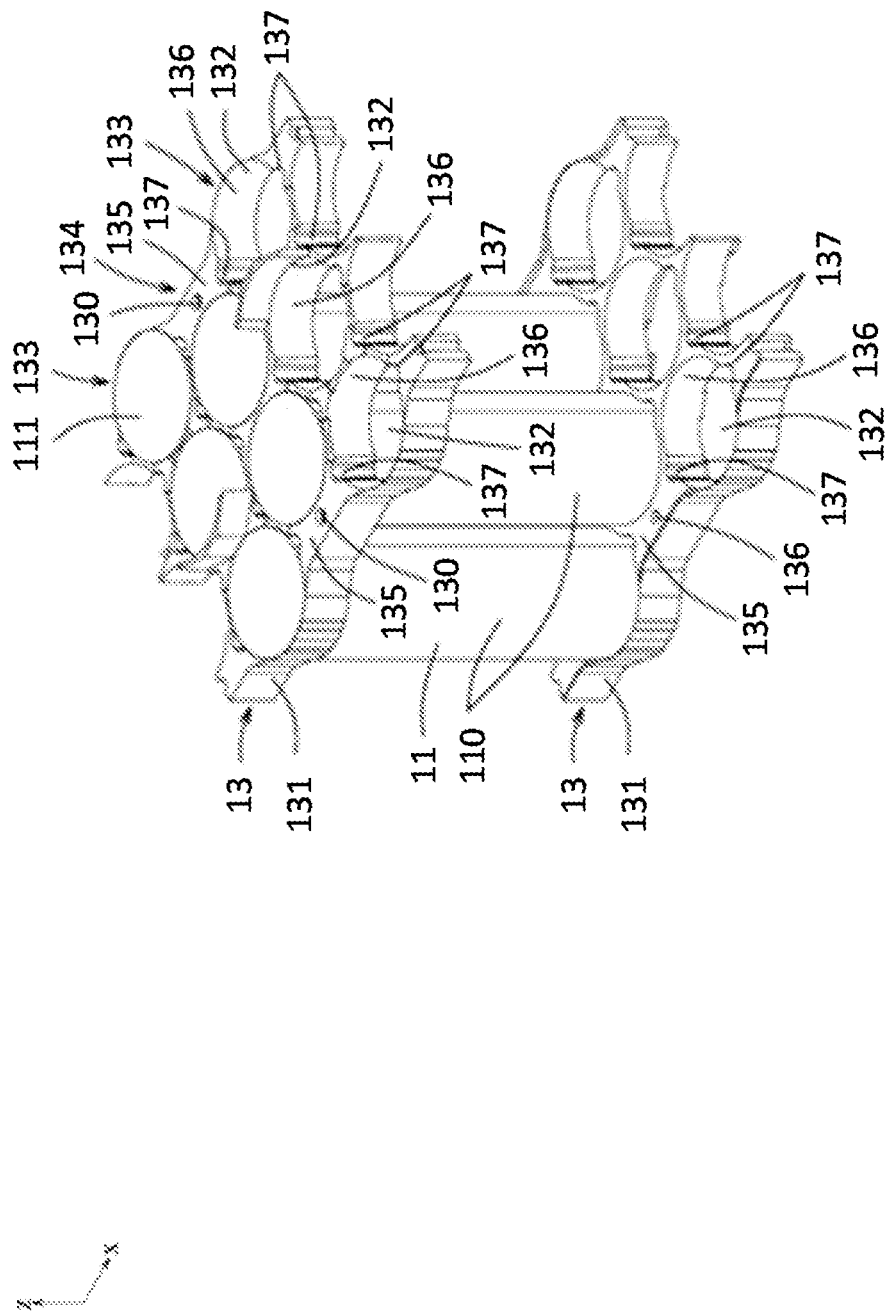
FIG. 7 is a fragmentary perspective view illustrating battery cells of the battery modules retained by two cell fixtures according to an example implementation of the present application.

FIG. 7 is a fragmentary perspective view illustrating battery cells of the battery modules retained by two cell fixtures according to an example implementation of the present application.

For retaining the battery cells 11 in the tubular space 120, in some implementations, the battery module 100 may include at least one cell fixture 13. It should be noted that the present application is not limited in the example implementations with respect to FIG. 7, the skilled person may design the elements for retaining the battery cells in the tubular space 120 as their needs.

Referring to FIG. 7, the cell fixture 13 may include a holding web 131 which is fitted inside the tubular space 120 and may be formed with a plurality of rows of retaining holes 132. The retaining holes 132 of each row are staggered with the retaining holes 132 of an adjacent row and configured to retain the cell bodies 110 of a respective row of the battery cells 11 so as to permit the battery cells 11 to be held in the tubular space 120 by the holding web 131, to thereby keep the battery cells 11 in stable position against undesired vibration. In some implementations, the first and second terminals 111, 112 of each battery cell 11 may be disposed at two opposite sides of the holding web 131.

In some implementations, the retaining holes 132 of each odd row 133 may be staggered with the retaining holes 132 of an adjacent even row 134 to leave a pair of outboard regions 135 disposed outboard of the retaining holes 132 of the adjacent even row 134. Two through holes 130 may be formed respectively in the outboard regions 135 for passage of the thermal management fluids.

In some implementations, the holding web 131 may have a plurality of inner peripheral surfaces 136 which define the retaining holes 132, respectively. Each of the inner peripheral surfaces 136 may be formed with two grooves 137 which extend respectively in the upright direction (Z) to permit passage of the thermal management fluids, and which are diametrically opposite to each other.

In some implementations, the rows of the retaining holes 132 may be displaced from each other in a longitudinal direction (X) as shown in FIG. 7.

In some implementations, the battery module 100 may include two of the cell fixtures 13 which are displaced from each other in the upright direction (Z) as shown in FIG. 7.

In some implementations, the passing holes 103 shown in FIGS. 4 and 6 may be positioned in positions corresponding to the grooves 137 of the holding web 131 as shown in FIG. 7.

It should be noted that, the electrical connections among the battery cells 11 and the first and second electrode plates 14, 15 may heat up easily, the heat dissipating in the form of waste heat. If the battery cells 11 are electrically connected to the first and second electrode plates 14, 15 using a fuse element, the temperature change would adversely affect the fusing. The electrical connections being at a relatively high temperature may also adversely affect the efficiency of the battery module(s) 100. Cooling the electrical connections by submerging it in a thermal management fluid or a cooling fluid improves efficiency of the battery module(s) 100 and reduces power wastage. Please note that the battery module 100 differs from the conventional ones because the electrical connections may be completely submerged in the thermal management fluid so as to facilitate the electrical connected to be cooled more efficiently. In operation, all elements in the battery module 100 such as the battery cells 11, the electrode plates 14, 15 and the cell fixture(s) 13 would be submerged in the thermal management fluid.

Figure 8:
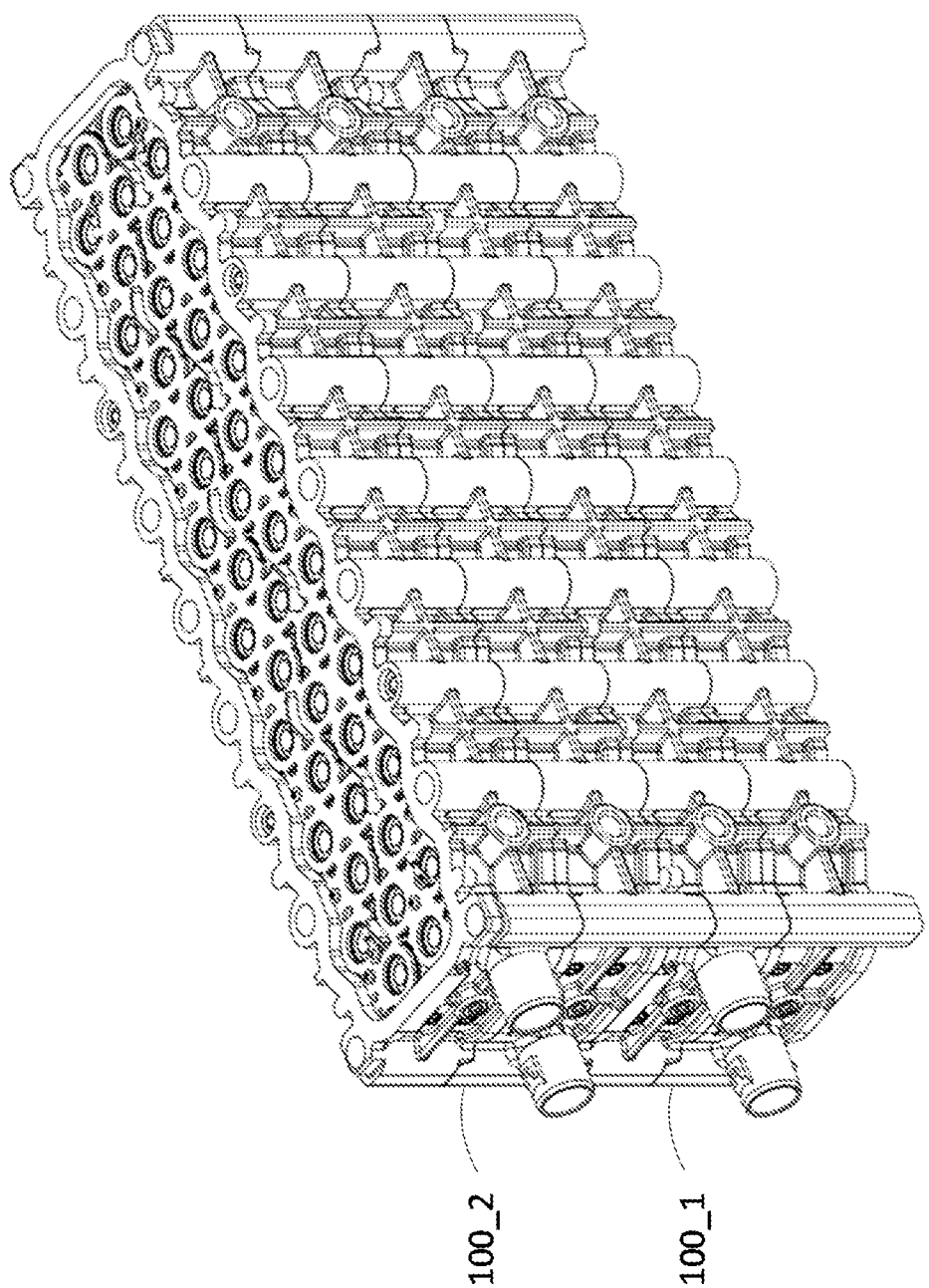
FIG. 8 is a perspective view illustrating two of the battery modules assembled together according to an example implementation of the present application.

FIG. 8 is a perspective view illustrating two of the battery modules assembled together according to an example implementation of the present application.

Referring to FIGS. 3 to 8, two battery modules 100 (i.e., battery module 100_1 and battery module 100_2 shown in FIG. 8) are assembled together. In other words, the aforementioned first or second external module may be another battery module 100. Specifically, the first connector structure 127 of the battery module 100_1 is connected to the second connector structure 126 of the battery module 100_2 by joining the first opening 101 of the tubular space 120 of the battery module 100_1 and the second opening 102 of the tubular space 120 of the battery module 100_2. Moreover, the first electrode plate 14 of the battery module 1001 is electrically coupled to the second electrode plate 15. In this case, a fluid channel is formed and the channel shape of the fluid channel is defined by at least the tubular space 120, the shape of the battery cells 11 and the shape of the first electrode plate 14 including the passing holes 130 of the battery module 100_1, and the tubular space 120, the shape of the battery cells 11 and the shape of the second electrode plate 15 including the passing holes 130 of the battery module 100_2. In operation, all elements of the battery modules 100_1, 100_2 located in the fluid channel may be submerged in the thermal management fluid.

FIG. 9A is a perspective view illustrating an interconnection module 200 according to an example implementation of the present application; FIG. 9B is a perspective view illustrating part of the interconnection module 200 according to an example implementation of the present application. The interconnection module IM2 as shown in FIG. 2 may be implemented according to the interconnection module 200 as shown in FIGS. 9A and 9B. For clarity, a first part electrode 224, a second part electrode 225, a first part hat 227 and a second part hat 228 are removed from the interconnection module 200 of FIG. 9A when shown in FIG. 9B.

Referring to FIGS. 9A and 9B, an interconnection module 200 may include a housing 22 that defines an interconnection space 220 and the interconnection space 220 may include at least a first open entrance 201 and a second open entrance 202 facing in the same direction. Such design allows fluids flow into the interconnection space 220 from one of the first open entrance 201 and the second open entrance 202 and flow out the interconnection space 220 from the other one the first open entrance 201 and the second open entrance 202. As such, the thermal management fluid may make a U-turn by going through the interconnection module 200.

In some implementation, the housing 22 may include a first part hat 227 and a second part hat 228 disposed corresponding to the first open entrance 201 and the second open entrance 202 as shown in FIG. 9A. The first part hat 227 and the second part hat 228 further defines the shape of first open entrance 201 and the second open entrance 202, respectively. In some implementations, the first part hat 227 and the second part hat 228 are configured as two connectors of the interconnection module 200 for connecting to another module. In some implementations, the first part hat 227 and the second part hat 228 are configured to prevent the thermal management fluid from leakage in operation of the modular battery system.

Moreover, a first part electrode 224 may be disposed at the first open entrance 201, and a second part electrode 225 may be disposed at the second open entrance 202. The first part electrode 224 and the second part electrode 225 are electrically coupled together via a conductive path 226 embedded in the interconnection space 220. As such, the interconnection module 200 not only relays the thermal management fluid from one of the first open entrance 201 and the second open entrance 202 to the other one of the first open entrance 201 and the second open entrance 202, but also relays the electric current from one of the first open entrance 201 and the second open entrance 202 to the other one of the first open entrance 201 and the second open entrance 202.

In some implementations, the interconnection module 200 further include a connector structure disposed at each open entrance 201, 202 to the interconnection space 220. In some implementations, the connector structure may be disposed on the housing 22 (e.g., disposed on the first part hat 227 and/or the second part hat 228) of the interconnector module 200. The connector structure is configured to connect to an external module such as the aforementioned battery module 100, but which is not limited herein.

In some implementations, the interconnection module 200 further include a fluid seal component (not shown) disposed along the edge of each open entrance 201, 202 to the interconnection space 220, so as to create liquid seal at an interface of the interconnection module 200 and the external module connected thereto. The fluid sealing component is configured to prevent leakage of the thermal management fluid in operation of the modular battery system that includes the interconnection module 200. However, the specific configuration and the material thereof are not limited herein.

Figure 10:
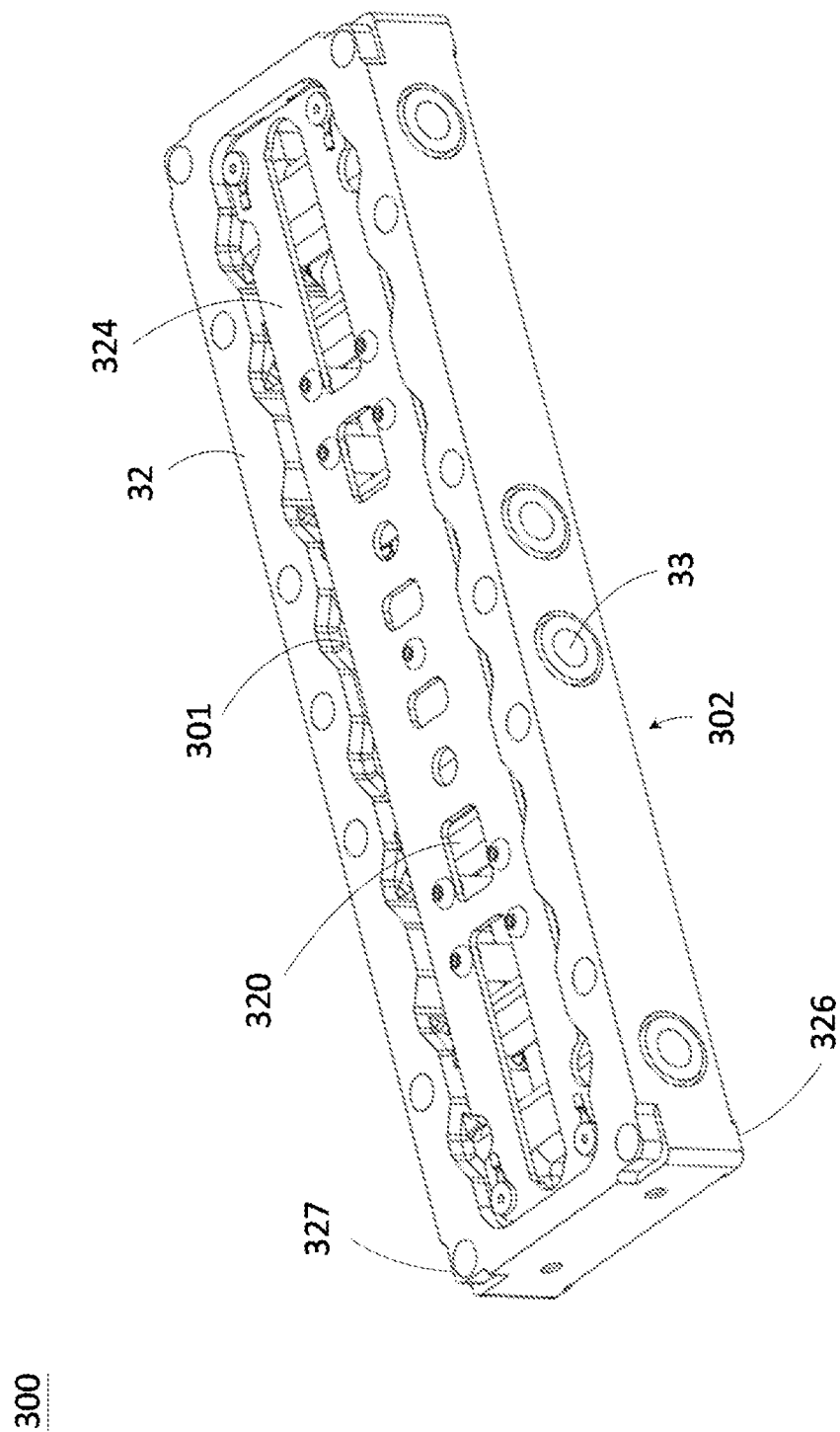
FIG. 10 is a perspective view illustrating an interconnection module according to another example implementation of the present application.

FIG. 10 is a perspective view illustrating an interconnection module according to another example implementation of the present application. The interconnection modules IM1, IM2 as shown in FIG. 2 may be implemented according to the interconnection module 300 as shown in FIG. 10. FIG. 10 shows a view of the interconnection module 300 from the side having the first open entrance 301, it is noted that two sides of the interconnection modules 300 may be symmetric.

Referring to FIG. 10, an interconnection module 300 may include a housing 32 that defines an interconnection space 320 and the interconnection space 320 may include at least a first open entrance 301 and a second open entrance 302 facing in opposite directions. Such design allows fluids flow into the interconnection space 320 from one of the first open entrance 301 and the second open entrance 302 and flow out the interconnection space 320 from the other one the first open entrance 301 and the second open entrance 302. As such, the fluid channel in a battery string of a modular battery system may be extended by the interconnection module 300.

Moreover, a first part electrode 324 may be disposed at the first open entrance 301, and a second part electrode (not shown) may be disposed at the second open entrance. The first part electrode 324 and the second part electrode are electrically coupled together via a conductive path (not shown) embedded in the interconnection space 320. As such, the interconnection module 300 not only relays the thermal management fluid from one of the first open entrance 301 and the second open entrance 302 to the other one of the first open entrance 301 and the second open entrance 302, but also relays the electric current from one of the first open entrance 301 and the second open entrance 302 to the other one of the first open entrance 301 and the second open entrance 302.

In some implementations, the interconnection module 300 further include a connector structure (for example but not limited to, the first connector structure 327 and/or the second connector structure 326). In some implementations, the connector structure may be disposed at each open entrance 301, 302 to the interconnection space 320. In some implementations, the connector structure may be disposed on the housing 32 of the interconnector module 300. The connector structure is configured to connect to an external module such as the aforementioned battery module 100, but which is not limited herein.

In some implementations, the interconnection module 300 further include a fluid seal component (not shown) disposed along the edge of each open entrance 301, 302 to the interconnection space 320, so as to create liquid seal at an interface of the interconnection module 300 and the external module connected thereto. The fluid sealing component is configured to prevent leakage of the thermal management fluid in operation of the modular battery system that includes the interconnection module 300. However, the specific configuration and the material the are not limited herein.

It is noted that the interconnection space 320 does not include any battery cells. In some implementations, at least one through hole 33 may be designed on the housing 32 of the interconnection module 300 and configured for passing through a bracket used for supporting the modular battery module. In some implementations, the interconnection module 300 may be adopted as a bridge over environments not suitable tot battery cells (e.g., areas with particularly severe vibration, high temperature, or strong magnetic field).

The interconnection modules 200 and 300 are illustrated herein as two examples of the interconnection module that can be used in the modular battery system. However, the present application is not limited thereto. In some implementations, the interconnection module may have more than two open entrances. In some implementations, the open entrances of the interconnection module may face to different directions. In some implementations, the surface profile of the interconnection module may be designed as requirement.

According to the above, a modular battery system may be form by a battery string and two management modules capped on both sides of the battery string, where the battery string may include at least one battery module connected together (e.g., in series). As such, the total voltage of the modular battery system may be an integrated voltage of the battery modules in the battery string. In operation, the thermal management fluid may be fed into the modular battery system from (a fluid feedthrough of) a first management module, flow through the fluid channel including the inner chamber of the first management module, at least one tubular space of the at least one battery module and the inner chamber of a second management module, and flow out the modular battery system from (a fluid feedthrough of) the second management module. Furthermore, the battery string may include at least one interconnection module, therefore the fluid channel may further include the interconnection space(s) of the interconnection module(s). By selecting appropriate battery module(s) and/or interconnection module(s), the modular battery system may be assembled into any required size and shape. Noted that the whole conductive path of the electric current (e.g., the battery cells, the electrode plates and/or the electrodes of all modules in the modular battery system) may be submerged in the thermal management fluid in operation.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A battery module, comprising:
an outer casing comprising a peripheral sidewall, the peripheral sidewall defining a tubular space with a first opening and a second opening, the peripheral sidewall comprising a first edge and a second edge, the first edge defining the first opening by surrounding the first opening, and the second edge defining the second opening by surrounding the second opening;
at least one battery cell disposed in the tubular space; and
a first connector structure disposed on the first edge of the peripheral sidewall and configured to fasten a first external module, comprising a first open entrance, to a first external space,
wherein:
the peripheral sidewall extends in an upright direction to terminate at the first edge and the second edge,
the tubular space is configured to permit a thermal management fluid to flow through the tubular space from one of the first opening and the second opening to the other one of the first opening and the second opening so as to allow the at least one battery cell to be cooled by the thermal management fluid, and
when the first connector structure fastens the first external module, a fluid channel is formed by joining the first opening and the first open entrance, and a shape of the fluid channel is defined by the tubular space, a shape of each of the at least one battery cell, and the first external space.

2. The battery module of claim 1, wherein:
the first external module further comprises an electrode disposed at the first open entrance, and
when the first connector structure fastens the first external module, at least one first terminal of the at least one battery cell is electrically coupled to the electrode via a conductive path located in the fluid channel.

3. The battery module of claim 1, further comprising:
a fluid sealing component disposed on the periphery sidewall along the first edge and configured to create a liquid seal at an interface of the battery module and the first external module when the first connector structure fastens the first external module.

4. The battery module of claim 1, further comprising:
a second connector structure disposed on the second edge of the peripheral sidewall and configured to fasten a second external module, comprising a second open entrance, to a second external space,
wherein when the first connector structure fastens the first external module and the second connector structure fastens the second external module, the fluid channel is formed by joining the first opening and the first open entrance and by joining the second opening and the second open entrance, and the shape of the fluid channel is defined by the tubular space, the shape of each of the at least one battery cell, the first external space, and the second external space.

5. The battery module of claim 4, further comprising:
a fluid sealing component disposed on the periphery sidewall along the second edge and configured to a create liquid seal at an interface of the battery module and the second external module when the second connector structure fastens the second external module.

6. The battery module of claim 4, wherein the first connector structure is adapted to the second connector structure.

7. The battery module of claim 6, wherein
when the first external module is a second battery module, the first external space is a tubular space defined by a peripheral sidewall of the second battery module, and the first open entrance is an opening defined by a sidewall edge of the second battery module, and
when the second external module is a third battery module, the second external space is a tubular space defined by a peripheral sidewall of the third battery module, and the second open entrance is an opening defined by a sidewall edge of the third battery module.

8. The battery module of claim 7, further comprising:
a first electrode electrically coupled to at least one first terminal of the at least one battery cell and disposed in the first opening; and
a second electrode electrically coupled to at least one second terminal of the at least one battery cell and disposed in the second opening, wherein
when the first connector structure fastens the second battery module, the first electrode is electrically coupled to a third electrode of the second battery module while the first electrode and the third electrode are located in the fluid channel, and
when the second connector structure fastens the third battery module, the second electrode is electrically coupled to a fourth electrode of the third battery module while the second electrode and the fourth electrode are located in the fluid channel.

9. The battery module of claim 8, further comprising:
a conductive elastic component electrically coupled to the first electrode,
wherein when the first connector structure fastens the second battery module, the first electrode is electrically coupled to the third electrode of the second battery module via the conductive elastic component while the first electrode, the third electrode, and the conductive elastic component are located in the fluid channel.

10. The battery module of claim 1, further comprising:
a first electrode electrically coupled to at least one first terminal of the at least one battery cell and disposed in the first opening.

11. The battery module of claim 10, wherein:
the first electrode is a first electrode plate contacting the at least one first terminal of the at least one battery cell,
the first electrode plate comprises a plurality of passing holes, and
when the first connector structure fastens the first external module, the shape of the fluid channel is further defined by the tubular space, the shape of each of the at least one battery cell, the shape of the plurality of passing holes, and the first external space.

12. The battery module of claim 11, wherein the first electrode plate further comprises:
a plate body formed with at least one through bore in positions corresponding to the at least one first terminal;
at least one contact pad disposed in each of the at least one through bore and electrically contacting the at least one first terminal; and
each of at least one fusible rib linking one of the at least one contact pad to the plate body,
wherein a melting point of the at least one fusible rib is lower than both a melting point of the plate body and a melting point of the contact pad.

13. The battery module of claim 10, further comprising:
a conductive elastic component electrically coupled the first electrode, wherein the first external module further comprises a second electrode disposed in the first open entrance, and when the first connector structure fastens the first external module, the first electrode is electrically coupled to the second electrode via the conductive elastic component while the first electrode, the second electrode, and the conductive elastic component are located in the fluid channel.

14. The battery module of claim 10, further comprising:
a second connector structure disposed on the second edge of the peripheral sidewall and configured to fasten a second external module, comprising a second open entrance, to a second external space; and
a second electrode electrically coupled to a second terminal of each of the at least one battery cell and disposed in the second opening.

15. The battery module of claim 14, wherein:
the first electrode is a first electrode plate contacting the at least one first terminal of the at least one battery cell,
the first electrode plate comprises a plurality of first passing holes,
when the first connector structure fastens the first external module, the shape of the fluid channel is further defined by the tubular space, the shape of each of the at least one battery cell, the shape of the plurality of first passing holes, and the first external space,
the second electrode is a second electrode plate contacting at least one of the second terminal of the at least one battery cell,
the second electrode plate comprises a plurality of second passing holes, and
when the second connector structure fastens the second external module, the channel shape of the fluid channel is further defined by the tubular space, the shape of each of the at least one battery cell, the shape of the plurality of second passing holes, and the second external space.

16. The battery module of claim 15, wherein the first electrode plate further comprises:
a plate body formed with at least one through bore in positions corresponding to the at least one first terminal;
at least one contact pad disposed in each of the at least one through bore and electrically contacting the at least one first terminal; and
each of at least one fusible rib linking one of the at least one contact pad to the plate body,
wherein a melting point of the at least one fusible rib being lower than both a melting point of the plate body and a melting point of the contact pad.

17. A modular battery system, comprising:
a plurality of battery modules, including the battery module according to claim 1, connected in series and comprising a head battery module and a tail battery module;
a first management module connected to the head battery module and comprising:
a first housing defining a first inner chamber; and
a first fluid feedthrough disposed in the first housing and configured as an inlet of a temperature managing fluid; and
a second management module connected to the tail battery module and comprising:
a second housing defining a second inner chamber; and
a second fluid feedthrough disposed in the second housing and configured as an outlet of the temperature managing fluid,
wherein a fluid channel is formed, such that the temperature managing fluid:
flows from the first fluid feedthrough into the modular battery system,
flows through the fluid channel comprising flowing through the first inner chamber, a plurality of tubular spaces of the plurality of battery modules, and the second inner chamber, and
flows out of the modular battery system from the second fluid feedthrough.

18. The modular battery system of claim 17, wherein the plurality of battery modules comprises a first waist battery module and a second waist battery module, the modular battery system further comprising:
an interconnection module comprising:
a housing defining an interconnection space comprising a third open entrance and a fourth open entrance, the first waist battery module connected to the interconnection module at the third open entrance and the second waist battery module connected to the interconnection module at the fourth open entrance,
wherein flowing through the fluid channel further comprises flowing through the interconnection space.

19. The modular battery system of claim 18, wherein the first-third open entrance and the fourth open entrance are in different directions.

20. The modular battery system of claim 18, wherein the interconnection module further comprises:
a first part electrode disposed in the third open entrance;
a second part electrode disposed in the fourth open entrance and electrically coupled to the first part electrode via a conductive path inside the interconnection module,
wherein:
when the first waist battery module connects to the interconnection module at the third open entrance, at least one first terminal of at least one battery cell of the first waist battery module is electrically coupled to the second part electrode via the first part electrode and the conductive path, and
when the second waist battery module connects to the interconnection module at the fourth open entrance, at least one second terminal of at least one battery cell of the second waist battery module is electrically coupled to the first part electrode via the second part electrode and the conductive path.

* * * * *